Patented Aug. 30, 1949

2,480,212

UNITED STATES PATENT OFFICE 2,480,212

ELECTROMAGNETICALLY OPERATED MECHANISM

John Archibald Baines, London, England, assignor to Rotax Limited, London, England Application November 29, 1945, Serial No. 631,572
In Great Britain December 19, 1944

2 Claims. (Cl. 192—.02)

This invention relates to electromagnetically operated mechanisms of the kind sometimes referred to as actuators, and comprising the combination of an electric motor, and means for converting the rotary motion of the motor into a linear motion of a slidable member through which motion is imparted to an apparatus to be actuated. The object of the invention is to provide an improved form of such an actuator.

The invention comprises the combination of an electric motor, an epicyclic reduction gearing, an electromagnetic spring loaded brake and friction clutch situated between the said motor and gearing, a spindle rotatable by the gearing, a slidable member having a screw thread or equivalent connection with the spindle, a spring loaded friction brake associated with the spindle, and a unidirectional clutch interconnecting the brake and spindle for controlling the rate of return movement of the slidable member under the joint action of the motor and the load.

Figure 1:
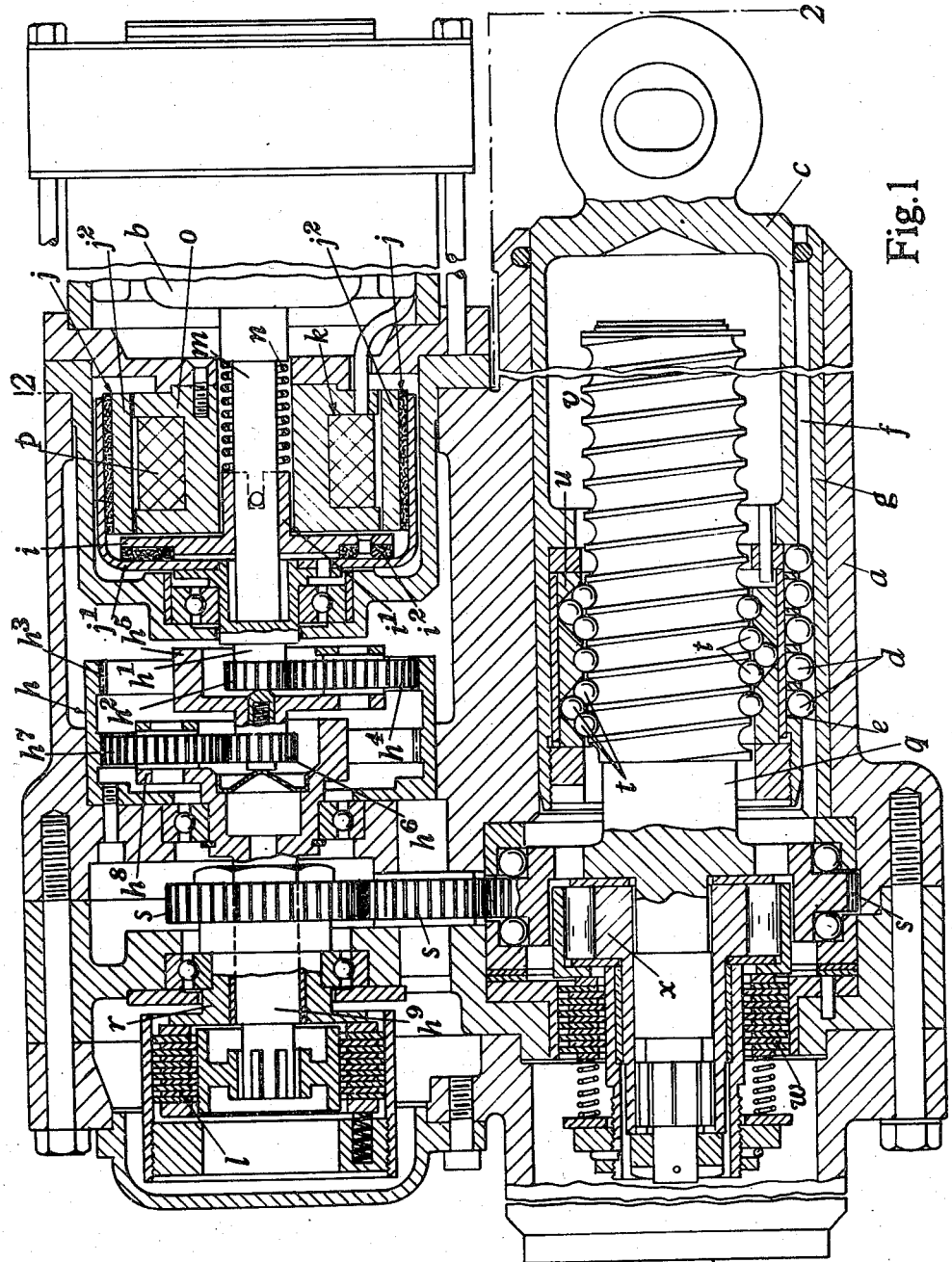
Figure 2:
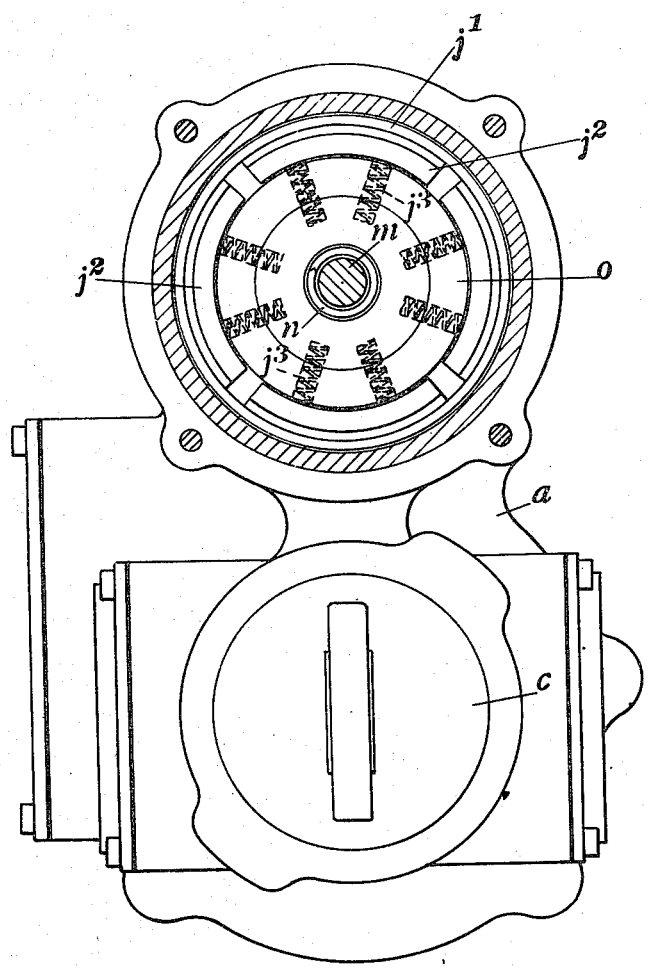

In the accompanying sheets of explanatory drawings:

Figure 1 is a sectional side view of an actuator constructed in accordance with the invention, and Figure 2 is a part sectional end view taken on the line 2—2 of Figure 1.

In carrying the invention into effect as shown, I employ an appropriate hollow body part or housing $a$ in one part of which is mounted a reversible electric motor $b$, and in another part of which is mounted a hollow cylndrical plunger $c$ (herein termed the slidable member) having its axis parallel with the axis of the motor, the said member being arranged to extend from one end of the housing and being in spline or like connection with the housing. Preferably and as shown this connection is effected by a row of balls $d$ engaging holes $e$ in the slidable member $c$ and a longitudinal groove $f$ in either the adjacent peripheral wall of the housing $a$ or a metal piece $g$ embedded in the said wall. Coaxially with the motor $b$ there is arranged in the housing $a$ an epicyclic reduction gearing $h$, and between this gearing and the motor is arranged a friction clutch $i$ and a spring loaded brake $j$, the latter having combined with it a releasing electro-magnet $k$.

Preferably and as shown the friction clutch $i$ consists of a disc slidably mounted on the spindle $m$ of the motor $b$ and having a central hollow boss $i^1$ through the medium of which the disc is pressed by a spring $n$ against an adjacent end face of a brake drum $j^1$ secured to the driving spindle $h^1$ of the epicyclic reduction gearing $h$.

Either the disc $i$ or the adjacent end face of the drum $j^1$ may be fitted with a layer of friction material $i^2$.

The brake $j$ is formed by the drum $j^1$ and a plurality of spring loaded brake shoes $j^2$ adapted to act on the inner periphery of the drum, the brake shoes being carried by a magnetisable member $o$ which is secured to a stationary part of the housing $a$, and which forms a part of the electromagnet $k$. Moreover, I combine with the magnetisable member $o$ an annular winding $p$ which forms the other part of the electromagnet $k$ and is adapted to be connected to the circuit of the motor $b$. The magnetisable member $o$ and shoes $j^2$ are so arranged that when the said member is magnetised by the current in the winding $p$, the shoes are retracted from the drum $j^1$ against the action of their loading springs $j^3$.

The epicyclic reduction gearing $h$ comprises a sun pinion $h^2$ on the driving spindle $h^1$, an internally toothed annulus $h^3$ secured to the stationary housing $a$, a planet pinion or pinions $h^4$ engaging the sun pinion and annulus, a carrier $h^5$ on which the planet pinion or pinions is or are mounted, a second sun pinion $h^6$ arranged coaxially with the first sun pinion and mounted on the planet pinion carrier, another planet pinion or pinions $h^7$ engaging the second sun pinion and the annulus, a second carrier $h^8$ on which the last mentioned planet pinion or pinions is or are mounted, and a driven spindle $h^9$ formed integrally with or having secured to it the second planet pinion carrier.

At the end of the epicyclic gearing $h$ remote from the motor $b$ is arranged a second friction clutch $l$ of spring loaded multiplate or other convenient form which is adapted to slip in the event of an over load, and motion is transmitted by this clutch from the driven spindle $h^9$ of the epicyclic gearing to another rotary spindle $q$ which is arranged coaxially with (and for the greater part within) the hollow slidable member $c$, the connection between the second clutch and the last mentioned spindle being effected through a sleeve $r$ on the driven spindle of the epicyclic gearing and interengaging gear wheels $s$.

Between the spindle $q$ and the slidable member $c$ is a screw thread or equivalent helical connection which may be of any convenient form, but which preferably consists as shown of an assembly of balls $t$ carried by a cage $u$ secured in the said member, the balls being adapted to engage a helical groove $v$ formed around the spindle. Also in association with the end of the spindle $q$ which projects from the slidable member $c$ there is arranged a spring loaded friction brake $w$ (preferably of the multiplate type), and one part of this brake is connectible to the said spindle by a unidirectional or free wheel clutch $x$. The arrangement is such that the brake $w$ is only operative during the return movement of the slidable member $c$, the purpose of this brake being to control the rate of the return movement of the slidable member $c$ under the joint action of the motor $a$ and the load acting on the slidable member. Without the brake $w$ the effect of the load on the slidable member $c$ would be to assist the motor $a$ and so tend to cause the return movement of the slidable member to occur at a greater rate than the outward movement. By means of the brake $w$ the rate of return motion of the slidable member $c$ can be suitably controlled.

When the motor $b$ is at rest, the slidable member $c$ is held against undesired movement by the brake $j$ associated with the motor. With the motor $b$ in action the brake $j$ is released, and the slidable member $c$ is moved inwards or outwards through the gearing above described. In the event of an excessive load being imposed on the slidable member $c$, the second mentioned friction clutch $l$ slips and so prevents injury to the mechanism. During return movement of the slidable member $c$, the unidirectional clutch $x$ comes into action and causes the other friction brake $w$ to control the rate of such movement.

An actuator as above described can be employed for actuation of the under carriage, or vane parts of an aeroplane, opening and closing of doors or windows, the movement of loaded platforms through predetermined distances, and many other analogous uses, and subordinate constructional details may be modified to suit different requirements.

Having thus described my invention what I claim as new and desire to secure by Letters Patent is:

1. An electromagnetically operated mechanism of the kind specified, comprising the combination of a reversible electric motor, an epicyclic reduction gearing, rotatable means including a friction clutch arranged between and interconnecting the motor and gearing, an electromagnetic spring loaded friction brake responsive to the current supplied to the motor and arranged to hold the said means against rotation when the motor is at rest, a spindle connected to and rotatable by the gearing, a slidable member having a helical connection with the spindle so that rotation of the spindle is accompanied by movement of the slidable member, a spring loaded friction brake associated with the spindle, and a unidirectional clutch interconnecting the spindle and the associated brake so that the later has no effect on rotation of the spindle in one direction, but serves to retard movement of the spindle in the opposite direction.

2. An electromagnetically operated mechanism as claimed in claim 1 and having a second spring loaded friction clutch situated between and interconnecting the epicyclic reduction gearing and the spindle.

JOHN ARCHIBALD BAINES.

REFERENCES CITED

The following references are of record in the file of this patent:

UNITED STATES PATENTS

| Number | Name | Date |
|---|---|---|
| 2,321,525 | Schroeder | June 8, 1943 |
| 2,387,713 | Bradford | Oct. 30, 1945 |
| 2,387,799 | Leland | Oct. 30, 1945 |
| 2,391,333 | Nardone | Dec. 18, 1945 |
| 2,403,094 | Lear | July 2, 1946 |
| 2,408,992 | Nardone | Oct. 8, 1946 |
| 2,411,101 | Milns | Nov. 12, 1946 |
| 2,429,425 | Nardone | Oct. 21, 1947 |
| 2,441,505 | Ochtman | May 11, 1948 |
| 2,451,109 | Nardone | Oct. 12, 1948 |